Nov. 11, 1969      G. M. DONAHUE      3,477,632
DISPENSING CONTAINER MEANS AND BLANKS FOR MAKING SAME
Filed June 8, 1967      6 Sheets-Sheet 5

INVENTOR.
GARY M. DONAHUE
BY
Glenn, Palmer & Lyne
HIS ATTORNEYS

United States Patent Office 3,477,632
Patented Nov. 11, 1969

3,477,632
DISPENSING CONTAINER MEANS AND BLANKS
FOR MAKING SAME
Gary M. Donahue, Chesterfield County, Va., assignor to
Reynolds Metals Company, Richmond, Va., a corporation of Delaware
Filed June 8, 1967, Ser. No. 644,635
Int. Cl. B65d 5/74
U.S. Cl. 229—17                                  9 Claims

ABSTRACT OF THE DISCLOSURE

This disclosure relates to a dispensing container means having extension flap means extending from its vertical wall means which are adapted to be fastened in a common plane to define top wall means for such container means, and such extension flap means comprise integral V-shaped chute means adapted to be extended outwardly from the top wall means for dispensing the contents of the container means therethrough.

BACKGROUND OF THE INVENTION

Many food products such as cereal products, for example, are sold in cartons each having a dispensing opening therein for dispensing its particular cereal product therethrough. However, the construction of most presently used cartons is such that they are difficult to open and it is also difficult to pour a cereal product out of its associated carton into a bowl, or the like, without some spillage. In addition, many present cartons are generally comprised of a comparatively stiff outer container and an inner bag-like liner which must be separately opened to enable pouring out of the product therein.

SUMMARY

This invention provides improved dispensing container means particularly adapted to be used for food products such as cereal products, or the like. The dispensing container means of this invention has an improved easily opened substantially V-shaped chute means of simple and economical construction defined as an integral part of its top wall means and which enables easy dispensing of the product carried within the particular container means with minimum or no spillage. Further, the container means of this invention may comprise an inner bag or liner which is constructed and fastened in position in such a manner to an associated outer surface means or carton of the particular container means to enable the provision of a dispensing opening in the inner bag or liner simultaneously with opening the outer carton.

Other details, uses, and advantages of this invention will become apparent as the following description of the embodiments thereof presented in the accompanying drawing proceeds.

BRIEF DESCRIPTION OF THE DRAWING

The accompanying drawing shows present preferred embodiments of this invention, in which.

DESCRIPTION OF ILLUSTRATED EMBODIMENTS

In the exemplary embodiment of this invention illustrated in FIGURES 1-6 of the drawings, a dispensing container means shown as a dispensing carton 20 is illustrated. Carton 20 has a pair of side wall means or side walls 21 and 22 arranged in parallel spaced apart relation and a pair of end wall means or end walls 23 and 24 also arranged in parallel spaced apart relation and having side edge means suitably fastened to associated side edges of side walls 21 and 22 so as to define carton 20 having vertical walls 21–24 arranged to define a substantially rectangular outline.

Figure 4:
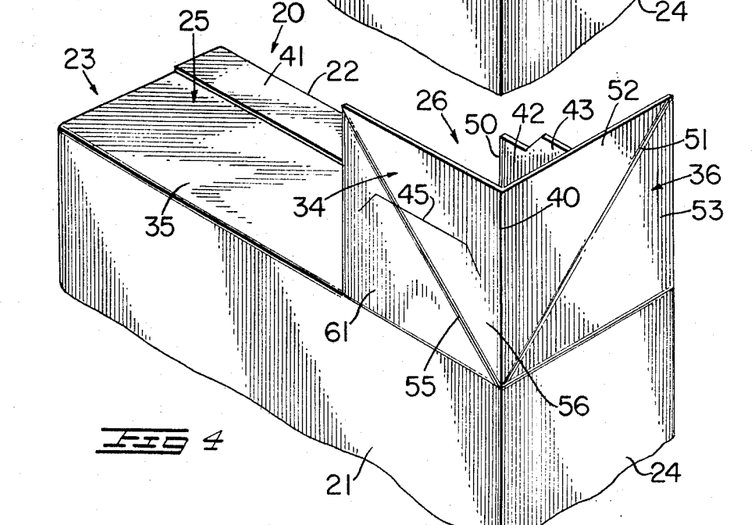
FIGURE 4 is a fragmentary perspective view similar to FIGURE 3 showing extension flap means comprising the top wall means folded outwardly to define substantially V-shaped chute means.
Figures 5, 6:
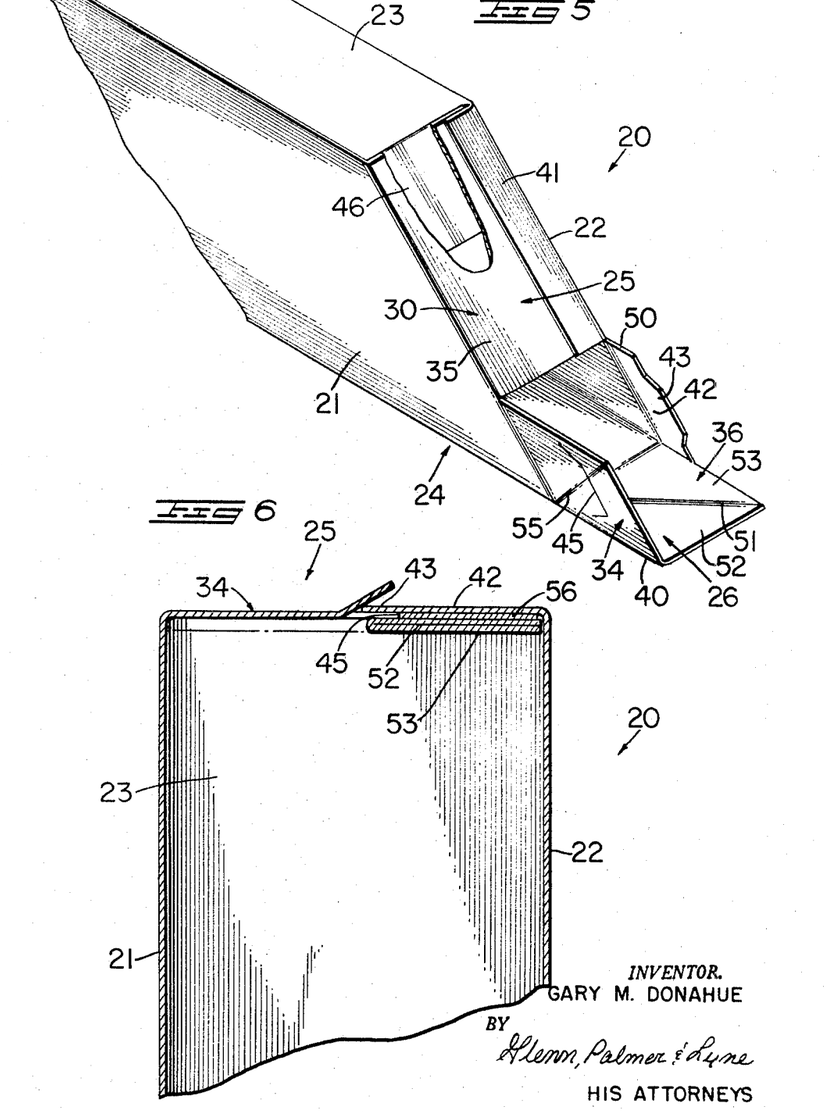
FIGURE 5 is a fragmentary perspective view illustrating the manner of tilting the now opened container means to enable dispensing of a product contained therewithin through its substantially V-shaped chute means.
FIGURE 6 is a sectional view on the line 6—6 of FIGURE 1.

Carton 20 has extension flap means extending from vertical walls 21–24 and such extension flap means are adapted to be fastened substantially in a common plane to define top wall means designated generally by the numeral 25, see FIGURES 4 and 5 of the drawings. Carton 20 has a substantially V-shaped chute means or a chute designated generally by the numeral 26 comprising an integral part of the extension flap means extending from the vertical wall means and the V-shaped chute 26 is adapted to extend from top wall 25 to enable dispensing of the product contained within carton 20. Dispensing carton 20 is of the type which is particularly adapted for containing and dispersing a product such as a precooked dry cereal, or the like.

Figure 1:
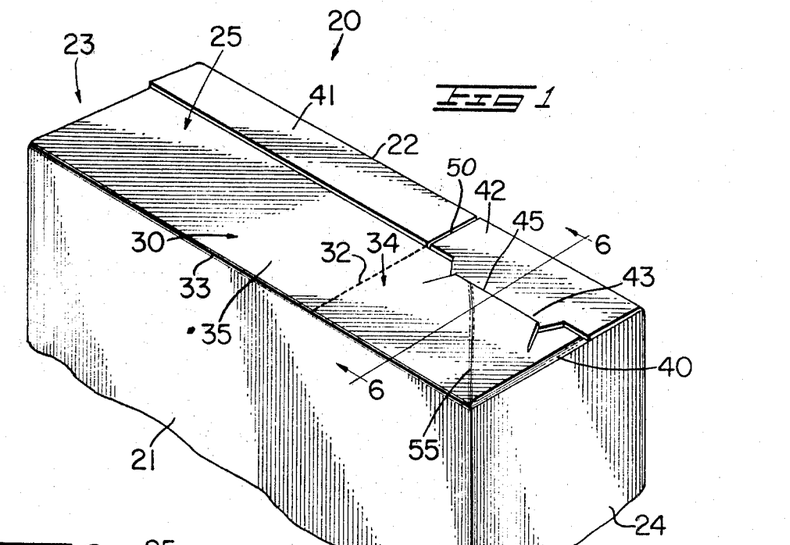
FIGURE 1 is a fragmentary perspective view showing the upper end portion of an exemplary embodiment of the improved dispensing container means of this invention and showing closure flap means provided therein held in a closed position.
Figure 2:
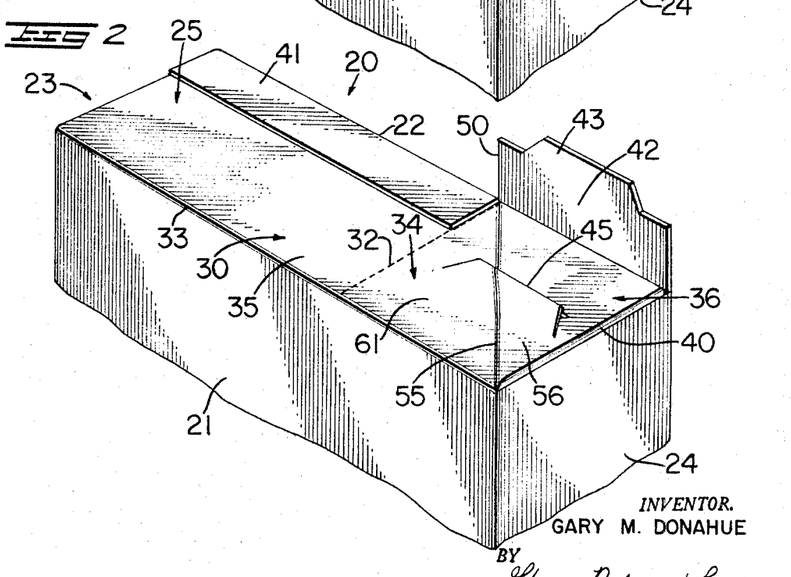
FIGURE 2 is a fragmentary perspective view of the first step of an exemplary four step sequence presented to show the ease with which the container means of FIGURE 1 may be opened and its contents removed, wherein the closure flap means is first extended outwardly as shown.

As seen particularly in FIGURES 2 and 5 of the drawings, the extension flap means extending from vertical walls 21–24 comprise a first extension flap means designated generally by the numeral 30 and extending from side wall 21, and second extension flap means shown as an extension flap 36 extending from end wall 24. Extension flap 30 has separation means provided therein which are shown as a plurality of rectilinear perforations designated by the numeral at 32 and extending from and perpendicular to the base 33 of extension flap 30 to the terminal outer end of extension flap 30.

Upon tearing along the rectilinear perforations shown at 32, a chute forming portion 34 of extension flap 30 is defined which extends between the rectilinear perforations 32 and the outer side edge of chute forming portion 34 which is arranged immediately adjacent end wall 24. The opposite side portion of extension flap 30 is arranged on the opposite side of the rectilinear perforations 32 and is designated by the numeral 35. Flap 35 is fastened in position in a manner as will be subsequently described.

The second extension flap 36 extending from end wall 24 has a cooperating side edge foldably fastened to the chute forming portion or flap 34 along a common score line 40 defining a common junction line between extension flap means 34 and 36. Thus, it is seen that extension flap means 34 and 36 are foldably fastened along score line 40 and upon being hinged or folded outwardly from top wall 25 define the V-shaped chute means 26 previously mentioned.

Third and fourth extension flap means shown as extension flaps 41 and 42 extend from the other side wall means or side wall 22 and in this example of the invention flaps 41 and 42 define outside surface means of top wall means or top wall 25. The extension flap 42 defines a closure flap for V-shaped chute 26 which is suitably fastened against the chute forming flap portion 34.

Closure flap 42 has a substantially trapezoidal closure tab 43 defining its terminal outer end and closure tab 43 is adapted to be inserted in position in a substantially U-shaped cut 45 corresponding roughly to the outline of tab 43 and adapted to receive closure tab 43 therethrough to hold the closure flap 42 in position. The closure flap 42 with its closure tab 43 and U-shaped cut means 45 define closure means for carton 20 and such closure means is constructed to enable easy opening and reclosing of carton 20 to dispense its contents.

End wall 23 also has extension flap means shown as an extension flap 46, see FIGURE 5, which is adapted to be folded in position beneath flap portion 35 of extension flap 30 prior to folding flap portion 35 in position and then folding outer flap 41 in position thereagainst. Extension flap 46 serves as a backup flap for extension flaps 35 and 41 and helps increase the structural stability of assembled carton 20.

The plurality of rectilinear perforations in extension flap 30 illustrated at 32 and also referred to as perforations 32 extend from base portion 33 as previously mentioned and are arranged substantially in line with the inner side edge designated by the numeral 50 of closure flap 42. Upon unfastening closure flap 42 from within its cooperating substantially U-shaped cut 45 the closure flap 42 is folded to the position illustrated in FIGURE 2 of the drawing thereby exposing the entire series of rectilinear perforations 32 so that extension flap 30 may be severed thereacross in a simple manner and as will be described in more detail later in this specification.

As seen particularly in FIGURE 4 of the drawing, the second extension flap means or extension flap 36 extending from end wall 24 is of substantially rectangular peripheral outline. Extension flap 36 has diagonal score means shown as a diagonal score line 51 extending thereacross from the inner or lower end of the common junction line or common score line 40 provided between extension flaps 34 and 36.

The diagonal score line 51 defines first and second triangular areas designated respectively by the numerals 52 and 53 and with extension flap 36 being foldably fastened to chute forming portion 34 of extension flap 30 the triangular areas 52 and 53 enable the extension flap 34 to be folded substantially coplanar with the remainder of top wall means 25. Upon folding extension flap portion 34 in position the closure flap 42 may be fastened in position thereagainst and tab portion 43 is then inserted within the substantially U-shaped cut means 45.

The chute forming portion of extension flap 30, i.e. extension flap 34, is also of substantially rectangular outline and in this example of the invention has an area which corresponds roughly to the area of extension flap 36. Extension flap 34 has cooperating score means shown as a diagonal score line designated by the numeral 55. The cooperating score line 55 is arranged in extension flap 34 so that upon folding extension flap 36 about its diagonal score line 51 the triangular portions 52 and 53 are arranged in a substantially coplanar manner and the cooperating score line 55 in extension flap 34 is arranged parallel to and above diagonal score line 51.

Figure 3:
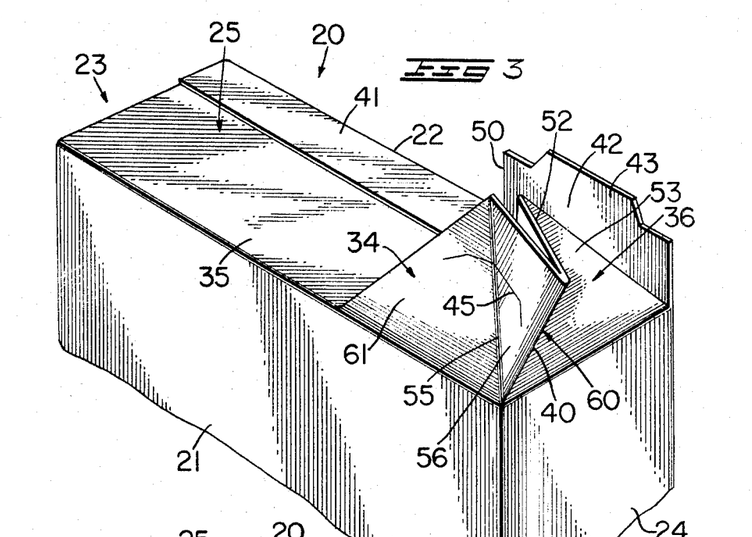
FIGURE 3 is a fragmentary perspective view similar to FIGURE 2 and showing the second step of such sequence.

Thus, it is seen that score lines 51 and 55 allow the first triangular portion 52 and that part of extension flap 34 overlapped thereagainst and designated by the numeral 56 to define grasping means designated generally by the numeral at 60 in FIGURE 3. Grasping means 60 is easily grasped and pulled outwardly to define the V-shaped chute means 26 previously described.

The previously mentioned U-shaped cut means 45 provided in extension flap 34 for holding closure tab 43 and hence closure flap 42 in position extends into substantially triangular portion 56 of extension flap portion 34 as well as into the adjoining triangular portion designated by the numeral 61 and arranged inwardly, on the opposite side, of the cooperating score line 55.

The improved carton 20 of this invention has its outer closure flap 42 fastened in position by inserting the tab portion 43 under U-shaped cut 45 provided in extension flap portion 34. It is not necessary that closure flap 42 be adhesively fastened to flap portion 34 in any manner whereby carton 20 may be initially opened and subsequently closed and reopened repeatedly without marring the outer appearance of the carton 20 in any way. Nevertheless, if desired, closure flap 24 may be initially fastened to flap 34 as by spot gluing, for example. It will be seen that prior to the initial opening of carton 20, that flap 30, with its chute forming portion 34, extends substantially completely across the top of carton 20 and assures the provision of a continuous wall means securely held in position by outer flap 41.

Normally no adhesive, or the like, is required to hold triangular flap portions 52 and 53 substantially coplanar with the remainder of top wall 25. Prior to severing along perforations 32 flap portion 34 and closure flap 42 hold flap portions 52 and 53 in position; and, after severing along perforations 32 closure flap 42 holds such triangular flap portions 52 and 53 in position.

Upon opening closure flap 42 the grasping means shown at 60 and defined by triangular flap portions 52 and 56 is exposed and easily grasped and pulled. In fact, once flap 42 is opened the tendency of the grasping means 60 to to move outwardly a small amount to enable easy grasping thereof.

By pulling grasping means 60 the series of rectilinear perforations 32 provided in extension flap 30 and extending substantially across the full width of top wall 25 are easily severed to thereby define a dispensing opening in the top wall of carton 20 while simultaneously the flap portions 34 and 36 define the V-shaped chute 26 extending from one corner of the dispensing carton 20. The dispensing carton 20 may then be tilted in the manner illustrated in FIGURE 5 of the drawing to easily dispense the product contained within carton 20 through the V-shaped chute means 26. The V-shaped chute means 26 is equally effective in dispensing a product such as a dry cereal or the carton 20 and its chute 26 may have their inside surface means suitably formed to enable storage and dispensing of a liquid product therethrough, if desired.

The separation means shown at 32 in this example of the invention have been described as perforations; however, it will be appreciated that in many applications of this invention it is preferable that apertures, or the like, should not extend through extension flap 30. Accordingly, any suitable weakening may be provided without severing clear through flap 30 even at spaced apart locations.

The outer extension flaps 41 and 42 extending from side wall 22 in this example of the invention extend beyond their associated wall 22 a comparatively small amount. However, it is to be understood that extension flaps 41 and 42 may be provided so as to extend any desired amount across top wall 25 including extending a smaller amount than illustrated or a larger amount even to as much as practically the full width across top wall 25, provided that the extension flap 30 is provided so that it extends from its associated side wall practically across the full width of top wall 25 and the separation means 32 is provided in flap 30 to perform a function essentially as described above.

Carton 20 can be formed in any suitable manner and made from any suitable foldable material. It is preferably formed from the carton blank 65 illustrated in FIGURE 7 of the drawings. Blank 65 is made of cardboard, or the like, having a side such as the exterior surface thereof laminated with metallic foil, such as aluminum-containing metallic foil, or the like, suitably colored, embossed, imprinted, or remaining plain, as desired.

Figure 7:
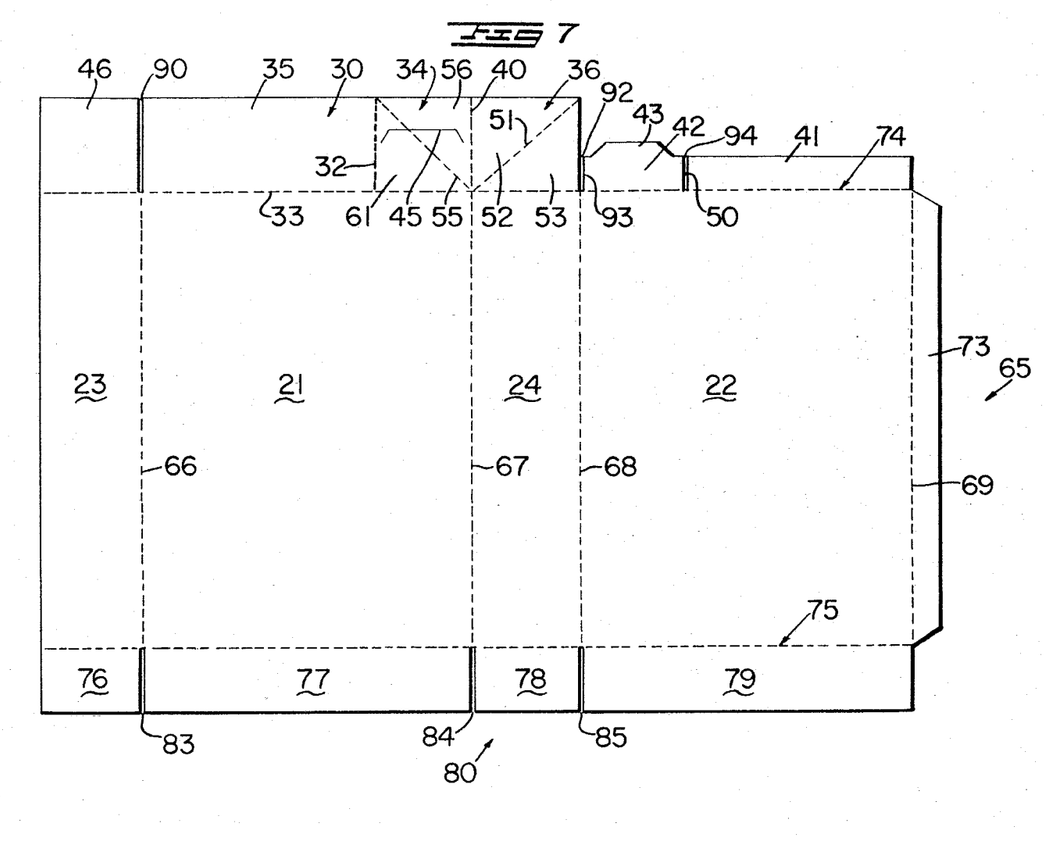
FIGURE 7 is a plan view of the blank used to make the complete container means of FIGURE 1.

Blank 65 is of roughly rectangualr peripheral outline and has a plurality of parallel spaced apart score lines 66, 67, 68, and 69 defining the extent in one direction respectively of end wall 23 between one edge of blank 65 and score line 66, side wall 21 between score lines 66 and 67, end wall 24 between score lines 67 and 68, side wall 22 between score lines 68 and 69, and a fastening flap 73 of substantially trapezoidal outline extending outwardly of score line 69 to the terminal end of blank 65. Fastening flap 73 may be fastened in position against end wall 23 in any suitable manner as by using suitable adhesive means, or the like.

Blank 65 also has a pair of parallel spaced apart score lines designated generally by the numerals 74 and 75 and defining therebetween the vertical height of the wall means 21–24.

The above description of the carton 20 has not made reference to a bottom wall for carton 20. However, it will be appreciated that a bottom wall may be formed in any suitable manner and in this example of the invention the blank 65 has a plurality of extension flaps 76, 77, 78, and 79 which are generally coextensive in width with their associated walls 23, 21, 24, and 22 respectively and adapted to be folded into a common plane and suitably fastened to define a bottom wall designated by the numeral 80.

Extension flap 76 is defined by rectilinear cut 83 extending in line with score line 66 and between score line 75 and one edge of blank 65, flap 77 is defined outwardly of score line 75 by cut 83 and a cut 84 extending in line with score line, flap 78 is defined outwardly of score line 75 by cut 84 and a cut 85 extending in line with score line 68, and flap 79 is defined outwardly of score line 75 and cut 85 and comprises the lower right hand corner of blank 75.

The top wall means or top wall 25 of the resulting carton 20 defined upon assemblying blank 65 is formed from a plurality of extension flap means extending outwardly of score line 74 which is arranged in blank 65 adjacent its top edge, as seen in FIGURE 7. Score line 74 defines top edge means of the vertical walls, of the resulting assembled carton 20 and the numeral 74 is used to refer to such score line throughout its length; however, a central portion of score line 74 which defines the top edge of side wall 21 as well as the base of the extension flaps extending from side wall 21 has also been designated by the numeral 33 for ease of description.

The extension flap means extending outwardly of the vertical wall means 21–24 are shown in the blank 65 as extending outwardly from score line 74 including portion 33 of score line 74.

Extension flap 46 extends outwardly of and beyond the top edge of end wall 23 and is defined by a portion of score line 74 and a rectilinear cut 90 which is arranged substantially in line with score line 66 while extending outwardly of score line 74 to the top edge of blank 65.

The extension flap 30 extending from side wall 21 is comprised of two flap portions 34 and 35. Extension flap portion 35 is defined by score line portion 33 of score line 74 at its base and by rectilinear cut 90 along one edge and rectilinear perforations 32 defining its opposite side edge. Extension flap portion 34 which is the chute forming portion extends outwardly of score line 74 and between rectilinear perforations 32 and a score line portion 40 which comprises the terminal outer end portion of score line 67. Score line portion 40 is arranged substantially in line with score line 67 between score line 74 and the terminal outer edge of blank 65 and defines the outer edge means of chute forming flap 34.

The extension flap 36 is arranged outwardly of score line 74 and its side edges are defined by score line 40 at one side and a rectilinear cut 92 at its opposite side. Rectilinear cut 92 is arranged substantially in line with score line 68 and extends outwardly of score line 74.

The previously mentioned closure flap 42 and outer flap 41 extend outwardly of side wall 22 and hence extend outwardly of score line 74, as illustrated. The closure flap 42 has its substantially trapezoidal tab portion 43 suitably defined in its terminal end and the side edges of extension flap 42 designated by the numerals 93 and 50 are defined respectively by rectilinear cut 92 arranged in line with and outwardly of score line 68 and a rectilinear cut 94 also defining the width of the closure flap 42. Rectilinear cut 94 is arranged parallel to cut 92 and extends outwardly of score line 74.

A pair of diagonally arranged score lines extend across extension flap portions 34 and 36 and are designated respectively by the numerals 55 and 51. Diagonal score line 55 bisects extension flap portion 34 into two triangular portions designated by the numerals 56 and 61 while diagonal score line 51 bisects extension flap portion 36 into two triangular portions 52 and 53.

The score line 51 enables the triangular extension flap portions 52 and 53 to be folded in a common plane to comprise a portion of top wall 25 in the manner previously described in connection with the carton 20 formed from blank 65; and, the score line 55 cooperating with score line 51 enables the provision of the easily grasped grasping means 60 used to open the resulting carton 20 as previously described.

Blank 65 also has substantially U-shaped cut means 45 provided in extension flap portion 34 for fastening the terminal end 43 of closure flap 42 in position. Cut means 45 intersects both triangular portions 56 and 61 of extension flap 34.

The particular structural arrangement illustrated for defining the substantially V-shaped chute means 26 in the resulting carton 20 made from blank 65 utilizes score line 40 to define the lower edge of chute means 26 and it will be seen that the flap portions 34 and 36 are foldably fastened together and to associated wall means so as to provide a continuous surface means connecting chute 26 to the main body of the resulting carton 20. Further, by providing the substantially V-shaped chute means in a corner of the resulting carton 20, as illustrated, it is a simple matter to tilt the resulting carton 20 in the manner shown in FIGURE 5 to assure that all of the contents within carton 20 are easily removed.

Another exemplary embodiment of the container means or carton of this invention is illustrated in FIGURES 8–11 of the drawings. The carton illustrated in FIGURES 8–11 is practically identical to carton 20; therefore, such carton will be designated generally by the numeral 20A and parts of carton 20A which are identical to corresponding parts of carton 20 will be designated by the same numeral as in carton 20 also followed by the letter designation A and not described again. Only those component parts which are different from corresponding parts in carton 20 will be designated by a new numeral also followed by the letter designation A and described in detail. The only difference between carton 20A and carton 20 is that carton 20A has sealed liner means shown as a sealed liner designated generally by the numeral 100A fastened therewithin.

The sealed liner 100A may be of any suitable construction but is preferably a bag-like liner which may be made of a moisture impervious material such as suitably coated paper, paper laminated with metallic foil, or of a suitable plastic or plastic-like material. The liner 100A is suitably fastened to at least either triangular portion 53A of extension flap 36A or to chute forming flap portion 34A of extension flap 30A. In this example of the invention, the liner 100A is preferably fastened to triangular portion 53A as well as to triangular portion 61A of extension flap portion 34A.

Figures 8, 9:
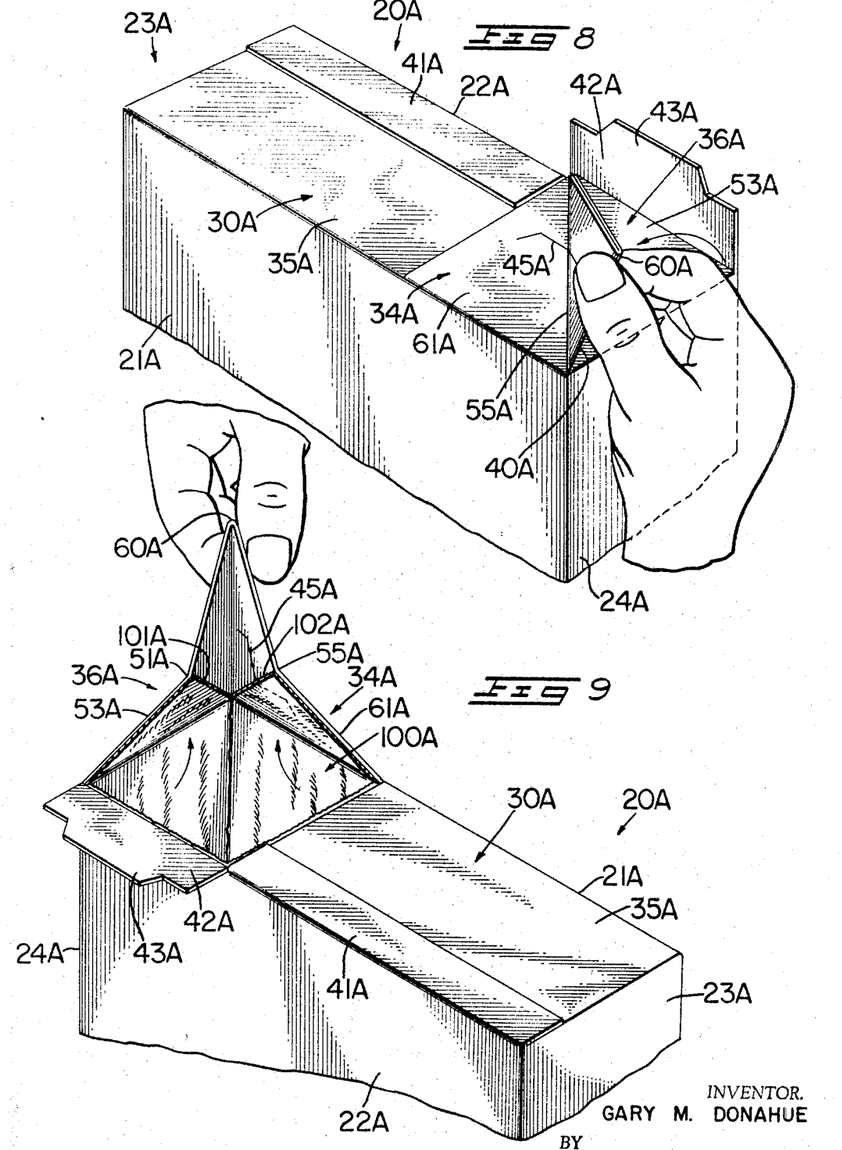
FIGURE 8 is a fragmentary perspective view similar to FIGURE 3 of the drawings and particularly illustrating the manner of grasping integral grasping means provided in the top wall means of another exemplary embodiment of container means of this invention which has an inner liner means or bag to enable the forming of a substantially V-shaped chute means therein and the simultaneous severing of the inner bag to simultaneously provide a dispensing opening and a dispensing chute.
FIGURE 9 is a fragmentary perspective view illustrating the manner of severing the inner bag in the container means of FIGURE 8.
Figure 10:
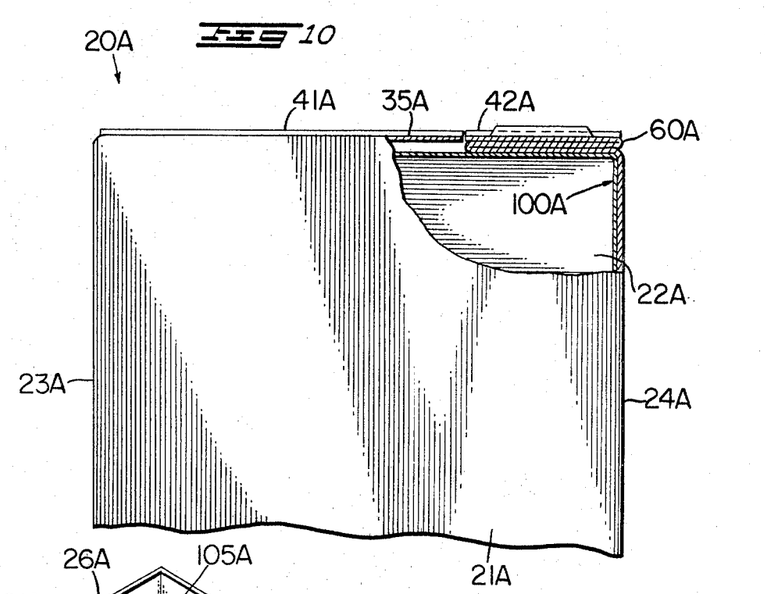
FIGURE 10 is a fragmentary view with parts in section and parts broken away illustrating the relative arrangement of the inner bag within the outer surface means or carton of FIGURE 8 and the relative position of extension flap means defining its substantially V-shaped chute means.
Figure 11:
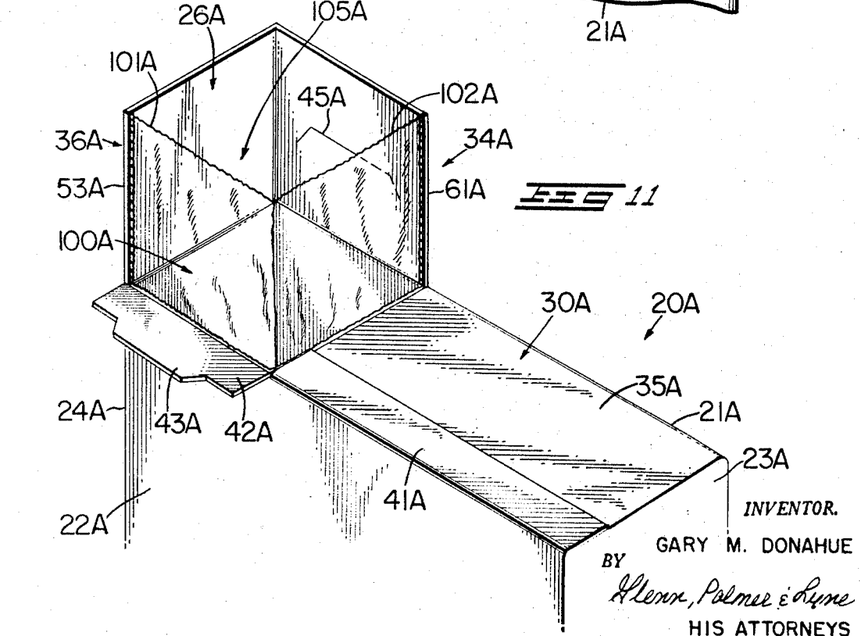
FIGURE 11 is a fragmentary perspective view showing the substantially V-shaped chute means of the container means of FIGURE 8 fully opened.

Thus, upon grasping the grasping means 60A as illustrated in FIGURE 8, and pulling outwardly in the manner illustrated in FIGURE 9, the inner bag liner 100A is severed substantially along a pair of severing lines designated by the numerals 101A and 102A, whereby a dispensing opening and V-shaped chute means 26A is simultaneously provided in the carton 20A in the manner as previously described in connection with carton 20.

However, in this latter embodiment of the invention, it will be seen that in addition to the forming of a dispensing opening and chute 26A an aligned dispensing opening is also provided in the inner bag liner 100A.

It will also be noted that the bag liner 100A is constructed and fastened in position so that portions thereof adhere along lines 101A and 102A previously mentioned and which coincide substantially with score lines 51A and 55A respectively. Thus, the inner liner 100A has continuous surface portions which conform with the outer surface means of chute 26A as shown generally at 105A and which upon folding extension flaps 34A and 36A in position and closing closure flap 42A thereagainst by inserting closure tab 43A within U-shaped cut 45A the previously defined dispensing opening in the bag 100A is substantially sealed by those portions of bag 100A which adhere to triangular portions 61A and 53A to assure optimum protection for a product such as a dry cereal contained within carton 20A after initially opening such carton and dispensing therefrom over an extended time period.

As previously mentioned, the bag liner 100A may be made of any suitable material and may be fastened in position so that its top outer surface means is fastened against triangular portions 61A and 53A. It may be desirable, for example, to assemble the outer surface means of carton 20A leaving the bottom end open and then inserting the bag liner containing a food product, such as a cereal, through the bottom end of carton 20A after having suitably applied suitable adhesive means to the top outer surface means of the bag liner 100A so that it will adhere to triangular portions 61A and 53A. The bottom wall means of carton 20A may then be suitably closed in a known manner.

The outside structural material or surface means comprising carton 20A is substantially identical to carton 20 and is made from a blank identical to the blank illustrated in FIGURE 7 of the drawings. Therefore, a detailed description of the blank used to form the outer portion of carton 20A will not be presented and reference may be made to the blank of FIGURE 7 for a thorough understanding of the outside surface means of container means or carton 20A.

Terms such as "upwardly," "side walls," "end walls," "top walls," "bottom walls," "outwardly," "inwardly," and the like, have been used in this disclosure of the invention for ease of description and to correspond to the various arrangements of views and component parts as presented in the drawings and such terms should not be considered as limiting the scope of this invention in any way.

Thus, it is seen that an improved inexpensive container means having integral substantially V-shaped dispensing chute means defined in its top wall means has been provided by this invention. The container means of this invention also provides easily grasped means enabling it to be easily opened, is particularly adapted for containing a food product such as a dry cereal, for example, has a closure flap which is fastened in position without adhesive means, and may be repeatedly and easily opened and reclosed.

Further, this invention provides blanks for making such improved container means.

While present preferred embodiments of this invention have been illustrated and described, it will be recognized that this invention may be otherwise variously embodied and practiced within the scope of the following claims.

What is claimed is:

1. A dispensing container means comprising, a pair of spaced apart side wall means, a pair of spaced apart end wall means fastened to said side wall means, extension flap means extending from said wall means and being fastened substantially in a common plane defining top wall means for said container means, and substantially V-shaped chute means comprising said extension flap means, said V-shaped chute means being adapted to extend from said top wall means to dispense the contents of said container means therethrough, and said extension flap means comprising first extension flap means extending from one of said side wall means, separation means in said first extension flap means defining a chute forming portion extending between said separation means and one side edge of said first extension flap means, second extension flap means extending from the end wall means arranged immediately adjacent said chute forming portion, said second extension flap means having a cooperating side edge fastened to said chute forming portion along said one side edge to form a common junction line therebetween, and a third and a fourth extension flap means extending from the other of said side wall means and comprising outside surface means of said top wall means, said fourth extension flap means defining a closure flap for said chute means having its base attached to said other side wall means and the remainder of its peripheral outer edge completely defined and free of adjacent structure, and said closure flap being initially fastened against said chute forming portion and upon unfastening thereof and severing along said separation means in said first extension flap means said chute forming portion and said second extension flap means are pulled outwardly in a simultaneous manner to define said V-shaped chute means.

2. A container means as set forth in claim 1 in which said second extension flap means has a rectangular peripheral outline and has diagonal score means extending from the inner end of said common junction line diagonally thereacross to define first and second triangular areas, said diagonal score means enabling said first and second triangular areas and said chute forming portion to be folded substantially coplanar with the remainder of said top wall means to enable said closure flap to be fastened thereagainst.

3. A dispensing container means comprising, a pair of spaced apart side wall means, a pair of spaced apart end wall means fastened to said side wall means, extension flap means extending from said wall means and being fastened substantially in a common plane defining top wall means for said container means, and substantially V-shaped chute means comprising said extension flap means, said V-shaped chute means being adapted to extend from said top wall means to dispense the contents of said container means therethrough, and said extension flap means comprising, first extension flap means extending from one of said side wall means, separation means in said first extension flap means defining a chute forming portion extending between said separation means and one side edge of said first extension flap means, second extension flap means extending from the end wall means arranged immediately adjacent said chute forming portion, said second extension flap means having a cooperating side edge fastened to said chute forming portion along said one side edge to form a common junction line therebetween, and a third and a fourth extension flap means extending from the other of said side wall means and comprising outside surface means of said top wall means, said fourth extension flap means defining a closure flap for said chute means having its base attached to said other side wall means and the remainder of its peripheral outer edge completely defined and free of adjacent structure, said closure flap being initially fastened against said chute forming portion and upon unfastening thereof and severing along said separation means in said first extension flap means said chute forming portion and said second extension flap means are pulled outwardly in a simultaneous manner to define said V-shaped chute means, said second extension flap means having a rectangular peripheral outline and having diagonal score means extending from the inner end of said common junction line diagonally thereacross to define first and second triangular areas, said diagonal score means enabling said first and second triangular areas and said chute forming portion to be folded substantially coplanar with the remainder of said top wall means to enable said closure flap to be fastened thereagainst, such chute forming portion of said first extension flap means having cooperating score means provided therein so that upon folding said second extension flap means about its diagonal score means said cooperating score means is arranged parallel to and above said diagonal score means, said cooperating score means and diagonal score means allowing said first triangular portion and a corresponding triangular portion of said chute forming portion overlapped thereagainst to define a double thickness triangular grasping means which is easily grasped and pulled outwardly to define said V-shaped chute means.

4. A container means as set forth in claim 3 having sealed liner means fastened therewithin, said sealed liner means having top outer surface means fastened to at least one of said portions of said extension flap means so that upon grasping said double thickness triangular grasping means and pulling outwardly a dispensing opening is simultaneously severed in said liner means which is aligned substantially with the entrance end of said V-shaped chute means to enable said dispensing in an easy manner.

5. A container means as set forth in claim 4 in which said closure flap has an integral closure tab defining its terminal end and said container means further comprises a substantially U-shaped cut in said chute forming portion of said first extension flap means, said U-shaped cut and closure tab cooperating to define closure means enabling said chute means to be easily opened and reclosed after initially opening same.

6. A container means as set forth in claim 3 in which said sealed liner means is made of a moisture impervious material, said liner means having top outer surface means adhesively fastened to said second triangular portion and to a part of said chute forming portion to assure tearing of an adequate size opening in said liner means upon pulling outwardly on said grasping means.

7. A blank being cut and scored and adapted to be fastened together to define a resulting dispensing container means, said blank comprising, a pair of side wall means, a pair of end wall means, said side wall means and end wall means being adapted to be fastened together to define vertical wall means of said resulting container means, extension flap means extending from said wall means and being adapted to be fastened substantially in a common plane to define top wall means for said resulting container means, and substantially V-shaped chute means comprising said extension flap means, said V-shaped chute means being adapted to extend from said top wall means of said resulting container means to dispense the contents of said resulting container means therethrough, and said extension flap means comprising, first extension flap means extending from one of said side wall means, separation means in said first extension flap means defining a chute forming portion extending between said separation means and one side edge of said first extension flap means, second extension flap means extending from the end wall means of said resulting container means which is arranged immediately adjacent said chute forming portion, said second extension flap means having a cooperating side edge foldably fastened to said chute forming portion along said one side edge on a common score line defining a junction line therebetween, and a third and a fourth extension flap means extending from the other of said side wall means and defining the outside surface means of said top wall means of said resulting container means, said fourth extension flap means defining a closure flap for said chute means having its base attached to said other side wall means and the remainder of its peripheral outer edge completely defined and free of adjacent structure, and said closure flap being initially fastened against said chute forming portion of said resulting container means and upon unfastening thereof and severing along said separation means in said first extension flap means said chute forming portion and second extension flap means are pulled outwardly in a simultaneous manner in said resulting container means to define said V-shaped chute means.

8. A blank as set forth in claim 7 in which said second extension flap means has a rectangular peripheral outline and has diagonal score means extending from the inner end of said common score line diagonally thereacross to define first and second triangular areas, said diagonal score means enabling said first and second triangular areas and said chute forming portion to be folder substantially coplanar with the remainder of said top wall means in said resulting container means to enable said closure flap to be fastened thereagainst.

9. A blank being cut and scored and adapted to be fastened together to define a resulting dispensing container means, said blank comprising, a pair of side wall means, a pair of end wall means, said side wall means and end wall means being adapted to be fastened together to define vertical wall means of said resulting container means, extension flap means extending from said wall means and being adapted to be fastened substantially in a common plane to define top wall means for said resulting container means, and substantially V-shaped chute means comprising said extension flap means, said V-shaped chute means being adapted to extend from said top wall means of said resulting container means to dispense the contents of said resulting container means therethrough, and said extension flap means comprising, first extension flap means extending from one of said side wall means, separation means in said first extension flap means defining a chute forming portion extending between said separation means and one side edge of said first extension flap means, second extension flap means extending from the end wall means of said resulting container means which is arranged immediately adjacent said chute forming portion, said second extension flap means having a cooperating side edge foldably fastened to said chute forming portion along said one side edge on a common score line defining a junction line therebetween, and a third and a fourth extension flap means extending from the other of said side wall means and defining the outside surface means of said top wall means of said resulting container means, said fourth extension flap means defining a closure flap for said chute means having its base attached to said other side wall means and the remainder of its peripheral outer edge completely defined and free of adjacent structure, and said closure flap being initially fastened against said chute forming portion of said resulting container means and upon unfastening thereof and severing along said separation means in said first extension flap means said chute forming portion and second extension flap means are pulled outwardly in a simultaneous manner in said resulting container means to define said V-shaped chute means, said second extension flap means having a rectangular peripheral outline and having diagonal score means extending from the inner end of said common score line diagonally thereacross to define first and second triangular areas, said diagonal score means enabling said first and second triangular areas and said chute forming portion to be folded substantially coplanar with the remainder of said top wall means in said resulting container means to enable said closure flap to be fastened thereagainst, said chute forming portion of said first extension flap means having cooperating score means provided therein so that upon forming said resulting container means and folding said second extension flap means about its diagonal score means said cooperating score means is arranged parallel to and above said diagonal score means, said cooperating score means and diagonal score means allowing said first triangular portion and a corresponding triangular portion of said chute forming portion overlapped thereagainst in said resulting container means to define a double thickness triangular grasping means which is easily grasped and pulled outwardly to define said V-shaped chute means.

References Cited

UNITED STATES PATENTS

| | | | |
|---|---|---|---|
| 2,345,978 | 4/1944 | Hultin | 229—17 |
| 2,346,364 | 12/1944 | Hultin | 229—17 |
| 2,417,498 | 3/1947 | Hultin | 229—17 |
| 2,565,182 | 8/1951 | Maxon | 229—17 |
| 2,583,856 | 1/1952 | Klein | 229—17 |
| 2,811,297 | 10/1957 | Maxon | 229—17 |
| 2,933,230 | 4/1960 | Yezek | 229—17 |
| 2,946,496 | 7/1960 | Stagmeier | 229—17 |
| 3,079,063 | 2/1963 | Yezek | 229—17 |
| 3,136,471 | 6/1964 | Brastad | 229—14 |

FOREIGN PATENTS 835,957  10/1938  France.

DAVIS T. MOORHEAD, Primary Examiner